April 12, 1960     C. W. WEAR     2,932,117
FISH HOOK REMOVERS
Filed Nov. 10, 1958
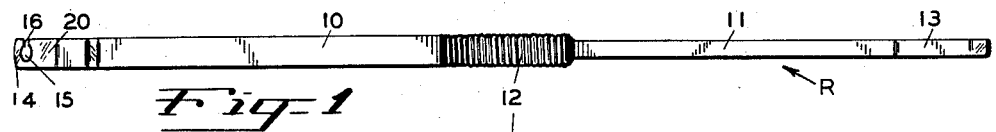
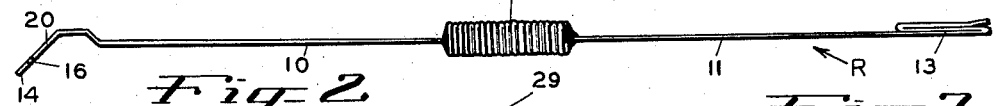
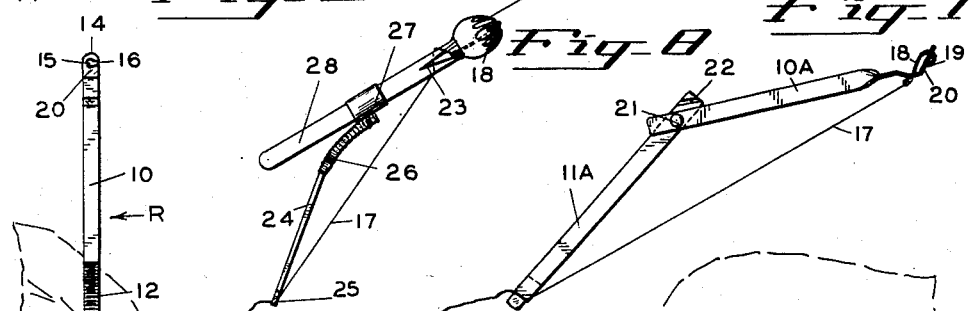
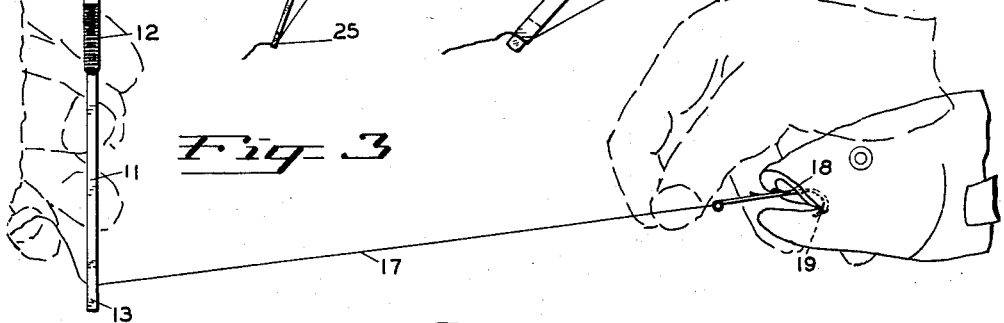
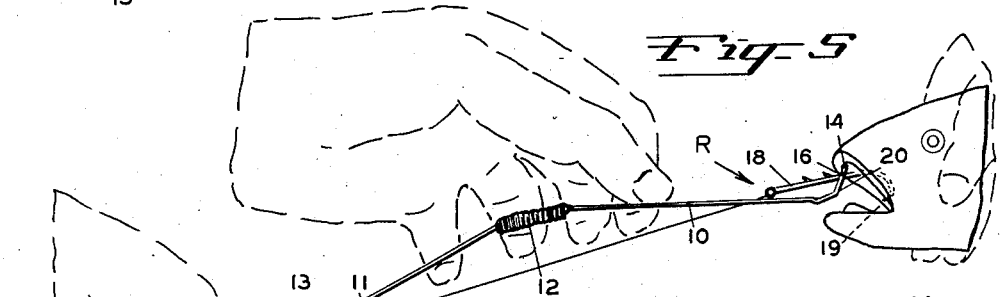
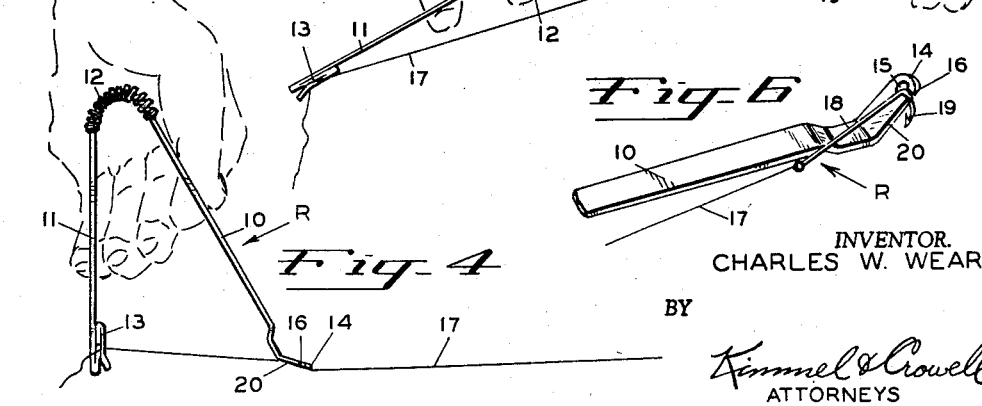
INVENTOR.
CHARLES W. WEAR
BY
*Kimmel & Crowell*
ATTORNEYS

United States Patent Office 2,932,117
Patented Apr. 12, 1960

2,932,117
FISH HOOK REMOVERS

Charles W. Wear, Naches, Wash.

Application November 10, 1958, Serial No. 772,964

4 Claims. (Cl. 43—53.5)

The present invention relates to fish hook removers and particularly those adapted for removing the hook from the mouth of the fish.

The primary object of the invention is to provide a fish hook remover to remove the hook from the fish's mouth and which will prevent rehooking of the fish or any other object.

A further object of this invention is to provide in a fish hook remover of the class described above means for holding the hook while attaching the leader thereto.

Other objects and advantages will become apparent in the following specification when considered in the light of the attached drawings, in which:

Figure 1 is a plan view of the invention;

Figure 2 is a side elevation of the structure shown in Figure 1;

Figure 3 is a view similar to Figure 1 which illustrates the device clipped to the line in the first step of removing the hook from the mouth of the fish;

Figure 4 is a side elevation which illustrates the opposite end of the device threaded to the line;

Figure 5 is a side elevation which illustrates the final position of the device with regard to the line and hook before pushing the hook out of the fish's mouth;

Figure 6 is an enlarged fragmentary perspective view illustrating the hook held to prevent snagging while removing the same from the fish's mouth;

Figure 7 is a side elevation of a modified form of the invention; and

Figure 8 is a side elevation of another modified form of the invention.

Referring now to the drawings in detail wherein like reference characters indicate like parts throughout the several figures, the reference character R indicates generally a fish hook remover constructed in accordance with the invention.

Referring to Figures 1 through 6 inclusive, the remover R is formed of a generally flat bar 10 and a generally flat bar 11 connected together by a flexible coil spring coupler 12. The outer end of the bar 11 has a double reverse bend 13 formed therein providing a means for clamping the leader of the fish hook during the operation of the invention.

The outer end of the bar 10 is offset, as best illustrated in Figures 2 and 6. On the tip 14 of the bar 10 is a hole 15 having a slot 16 leading thereto. The leader 17 is clamped in the reverse bend 13 remote from the hook 18 and extends through the hole 15 adjacent the hook 18, as illustrated in Figure 4.

Figure 6 illustrates the relation of the hook 18 to the bar 10 showing the point 19 of the hook behind the inclined offset 20. The offset 20 prevents the point 19 of the hook from hooking into any object, such as the fish's mouth, around which the same is being operated. The tip 14 of the offset 20 is used to force the hook 18 out of the fish's mouth while the offset 20 itself prevents the rehooking of the hook 18 into the surrounding objects.

The action of the spring coupler 12 tends to cause the bars 10 and 11 to come to an aligned position, making a taut condition of the leader 17 between the end 13 and the hook 18, as best illustrated in Figure 5.

When leaders 17 are to be tied to the hook 18, the hook 18 is placed down between the coils of the coupler spring 12, holding the same while the operator ties the loop in the leader 17.

Figure 7 shows a modified form of the invention with a pair of bars 10A and 11A pivoted together by pivot pin 21 and the operator himself places a tension on the leader 17 by the action of his hand and thumb. A groove or slot 22 is provided for placing the hook 18 therein and pivoting the bars in the proper direction to grip the hook 18 between the bars 10A and 11A for holding the hook 18 while tieing the leader 17 thereto. The outer ends of the bars 10A and 11A are the same as that of the bars 10 and 11, respectively, as illustrated in Figures 1 through 6.

Figure 8 illustrates another modified form of the invention wherein a standard device 23 for removing hooks from the mouth of the fish is combined with a bar 24, having a clamping end 25 formed on its outer end, and a resilient coupler member 26 secured to its opposite end, including a clamp 27. The clamp 27 surrounds the stem 28 of the device 23 so that the coupler member 26 will move the bar 24 and the device 23 apart, giving the same tightening action to the leader 17 as the above described forms, and also preventing the hook 18 from rehooking after it is once removed from the mouth of the fish. In the absence of the bar 24 and the spring coupler 26, the hook 18 would not remain within the tip 29 of the device 23.

Having thus described the preferred embodiments of the invention, it should be understood that numerous structural modifications and adaptations may be resorted to without departing from the scope of the appended claims.

What is claimed is:

1. A fish hook remover comprising a pair of members, means securing said members together for relative swinging movement, means on one of said members remote from said securing means for releasably clamping a fish hook leader therein, means on the other of said members remote from said securing means for engaging a fish hook for removal, said last mentioned means comprising an angularly offset portion formed on the free end of said other of said members and having a hook receiving aperture therein, said other member lying in a plane, said aperture being spaced from the plane of said other member, said members being movable to a generally aligned position to bind said fish hook in engagement with the means on the other of said members.

2. A device as claimed in claim 1 wherein said means securing said members together comprises a coil spring secured to adjacent ends of said bars.

3. A device as claimed in claim 1 wherein said means securing said members together comprises a pivot pin journalled in adjacent ends of said members.

4. A device as claimed in claim 1 wherein said releasable clamping means on one of said members comprises a double reverted portion formed integrally on said member.

References Cited in the file of this patent

UNITED STATES PATENTS

| | | |
|---|---|---|
| 541,354 | Hartmann | June 18, 1895 |
| 705,496 | Wales | July 22, 1902 |
| 1,043,627 | Risdon | Nov. 5, 1912 |
| 2,244,270 | Verrett | June 3, 1941 |
| 2,526,980 | Turchan | Oct. 24, 1950 |
| 2,561,281 | Lawrence | July 17, 1951 |
| 2,578,887 | Jackson et al. | Dec. 18, 1951 |
| 2,784,516 | Barnes et al. | Mar. 12, 1957 |
| 2,861,384 | Kubin | Nov. 25, 1958 |